United States Patent [19]
Yanagisawa

[11] Patent Number: 6,144,417
[45] Date of Patent: *Nov. 7, 2000

[54] WINDOW FRAME FOR SCREEN

[75] Inventor: Ken Yanagisawa, Matsumoto, Japan

[73] Assignee: Yugen Kaisha Sozoan, Nagano-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/740,902

[22] Filed: Nov. 4, 1996

[30]     Foreign Application Priority Data

Nov. 7, 1995 [JP] Japan .................................. 7-288370

[51] Int. Cl.[7] ........................... H04N 5/645; H04N 5/655
[52] U.S. Cl. .......................... 348/823; 348/824; 348/826
[58] Field of Search ................................... 348/834, 835, 348/836, 837, 840, 841, 115, 154, 113, 117, 118, 121, 122, 123, 124, 14, 15, 13, 818; 358/471, 479

[56]             References Cited

U.S. PATENT DOCUMENTS

| | | | |
|---|---|---|---|
| D. 291,086 | 7/1987 | Price ....................................... | D14/115 |
| 3,885,095 | 5/1975 | Wolfson et al. ......................... | 348/115 |
| 4,788,597 | 11/1988 | Gart ........................................ | 348/819 |
| 4,898,555 | 2/1990 | Sampson ................................. | 445/22 |
| 5,175,627 | 12/1992 | Josephs .................................... | 348/841 |
| 5,519,458 | 5/1996 | King ........................................ | 348/834 |
| 5,625,410 | 4/1997 | Washino et al. ......................... | 348/154 |
| 5,825,613 | 10/1998 | Holden .................................... | 361/681 |
| 5,894,192 | 4/1999 | Grabis ..................................... | 313/478 |

FOREIGN PATENT DOCUMENTS

| | | | |
|---|---|---|---|
| 343498A1 | 6/1985 | Germany ......................... | H01J 29/86 |
| 3443496A1 | 6/1985 | Germany ......................... | H01J 29/86 |
| 54-68113A | 6/1979 | Japan . | |
| 56-143185A | 11/1981 | Japan . | |
| 024339 | 1/1990 | Japan . | |
| 0431882 U | 5/1992 | Japan . | |
| 04270591 | 9/1992 | Japan . | |

*Primary Examiner*—Jerome Grant, II
*Attorney, Agent, or Firm*—Birch, Stewart, Kolasch & Birch, LLP

[57]             ABSTRACT

An object of the present invention is to provide a screen frame, which is capable of producing clear 3-D video images with a simple structure. The screen frame includes: a frame structure being capable of covering over a screen of a display unit at a prescribed distance away from the screen. Furthermore, the frame structure encloses a window space, whose size is smaller than the size of the screen of the display unit so as to cover parts of the display unit other than the screen. By attaching the screen frame of the present invention, which has a simple structure, to a screen of a display unit, video images on the screen have visual depth, so the user is hallucinated as if he or she is really watching an outdoor scene through a window. Furthermore, the video images on the screen can be made clear by removing influence of external light.

12 Claims, 9 Drawing Sheets

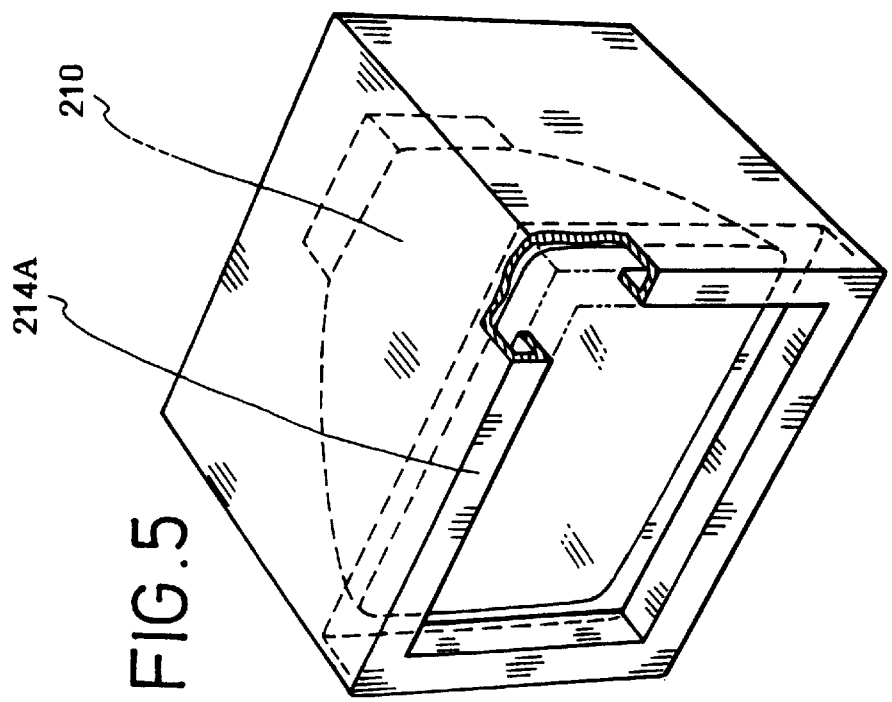
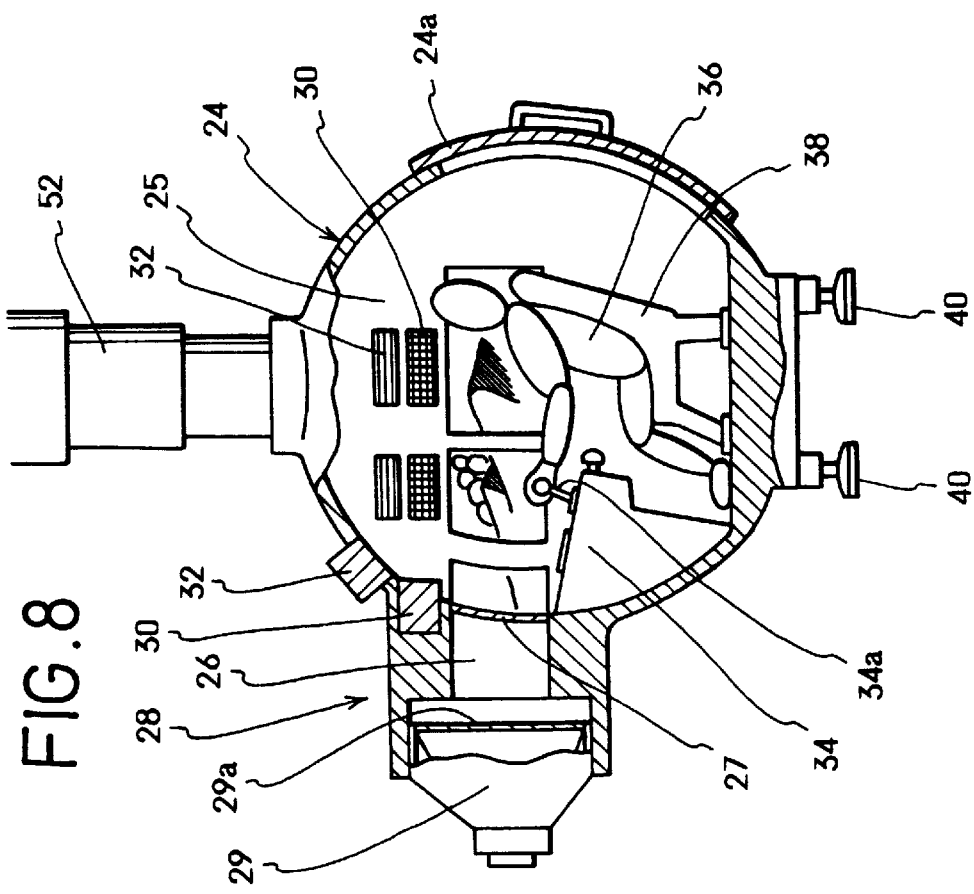

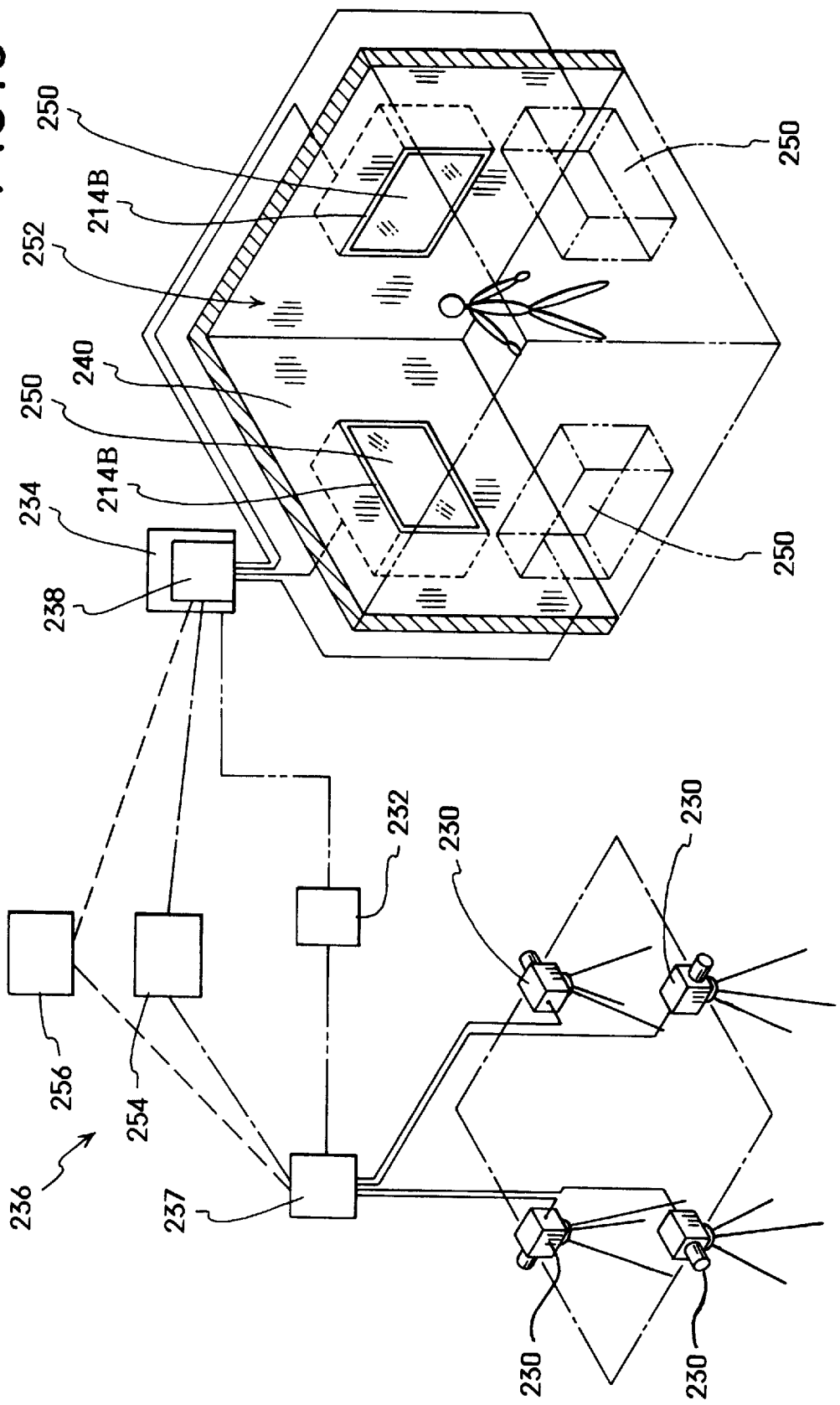

WINDOW FRAME FOR SCREEN

BACKGROUND OF THE INVENTION

The present invention relates to a screen frame.

Recently, virtual reality technology has been studied, and machines employing said technology have been developed. In the virtual reality technology, computer graphic images give us virtual images. Conventionally, in a video game machine, a user wears three-dimensional (3-D) view goggles, and the user can see a virtual 3-D game space. If movement of the video game machine is synchronized with scenes of the virtual space, the user experiences acceleration, etc. Thus, the user is hallucinated as if he or she is really playing in the actual space.

However, the conventional virtual reality technology depends on the computer graphics. To make virtual reality computer graphic software is expensive and time consuming.

Since the computer graphic images are animated, they are not sufficiently realistic.

In the conventional virtual reality game machine, the user must wear the goggles to see the 3-D view. The user wearing the goggles can enter the virtual space, but he or she is in the virtual space alone. Namely, the user cannot play jointly with others. Mental fatigue may occur if an isolated state goes on for a long time.

In the case of employing real video images instead of the virtual images, video images being sufficiently realistic can be produced with lower cost. However, a screen of a video display unit, e.g., a TV, has a flat face, so video images on the flat screen do not have enough visual depth; they also are not sufficiently realistic. Furthermore, the flat screen is apt to be influenced by external light, so the video images on the screen will be unclear. Therefore, it is impossible to show the virtual space with the conventional video display units which are sufficiently realistic.

SUMMARY OF THE INVENTION

An object of the present invention is to provide a screen frame, which is capable of producing clear 3-D video images with a simple structure.

Another object of the present invention is to provide a video system and a virtual simulator, which are capable of improving the reality of video images and simultaneously showing the improved images to a plurality of users.

To achieve the objects, a screen frame of the present invention, comprises:

a frame structure being capable of covering over a screen of a display unit at a position prescribed distance away from the screen thereof; and the frame structure enclosing a window space, whose size is smaller than the size of the screen of the display unit so as to cover parts of the display unit other than the screen.

The screen frame may further comprise: means for attaching the frame structure to the display unit.

A display unit of the present invention, comprises:

a screen; and a screen frame including a frame structure being capable of covering over the screen at a position prescribed distance away from the screen, the frame structure enclosing a window space, whose size is smaller than the size of the screen so as to cover other parts of the display unit other than the screen.

In the display unit, the screen frame may be integrated with a body part of the display unit.

In the display unit, a body of the display unit may be provided in a wall.

A video system of the present invention, comprises:

a plurality of video cameras, which are headed in mutually different directions;

a recording medium being capable of storing video data, which are sent from the video cameras;

a video reproducing unit for reproducing the video data, which have been stored in the recording medium, as video images;

a plurality of display units being respectively arranged at positions corresponding to the heading of the video cameras, the display units showing the video images, which are reproduced by the video reproducing unit, on their screens; and a plurality of frame structures being capable of respectively covering over the screen of each display unit at a position prescribed distance away from the screen thereof, each frame structure enclosing a window space, whose size is smaller than the size of the screen so as to cover parts of the display unit other than the screen.

Another video system of the present invention, comprises:

a plurality of video cameras, which are headed in mutually different directions;

means for transmitting video data, which are sent from the video cameras;

means for receiving the video data, which have been transmitted from the transmitting means;

a plurality of display units reproducing the video data, which have been received by the receiving means, as video images and showing the video images on their screens, the display units being respectively arranged at positions corresponding to the heading of the video cameras; and a plurality of screen frames being capable of respectively covering over the screen of each display unit at a position prescribed distance away from the screen thereof, each screen frame having a frame structure enclosing a window space, whose size is smaller than the size of the screen so as to cover parts of the display unit other than the screen.

A virtual simulator of the present invention, comprises:

a capsule for accommodating a man;

a drive system for moving the capsule;

a display unit being provided in the capsule, the display unit showing video images on its screen;

a screen frame being capable of covering over the screen of the display unit at a position prescribed distance away from the screen thereof, the screen frame having a frame structure enclosing a window space, whose size is smaller than the size of the screen so as to cover parts of the display unit other than the screen; and a control unit for controlling the drive system so as to synchronize the movement of the capsule while changing the video images on the screen of the display unit.

Another virtual simulator of the present invention, comprises:

a capsule for accommodating a man;

a drive system for moving the capsule;

a handling unit for manually controlling the drive system, the handling unit being provided in the capsule;

a display unit being provided in the capsule, the display unit showing video images on its screen;

a screen frame being capable of covering over the screen of the display unit at a position prescribed distance away from the screen thereof, the screen frame having a frame structure enclosing a window space, whose size is smaller than size of the screen so as to cover parts of the display unit other than the screen; and a control unit for synchronizing the video images on the screen with the movement of the drive system which is controlled by the handling unit.

In the virtual simulator, the drive system may comprise:

a pair of first fixed guides being arranged in parallel in a first direction;

a pair of second fixed guides being arranged in parallel in a second direction perpendicular to the first direction;

a first moving guide being arranged parallel to the first fixed guides, each end of the first moving guide being movably connected with each second fixed guide whereby the first moving guide is capable of moving in the second direction along side the second fixed guides;

a second moving guide being arranged parallel to the second fixed guides, each end of the second moving guide being movably connected with each first fixed guide whereby the second moving guide is capable of moving in the first direction along side the first fixed guides;

a moving body being connected with the capsule, the moving body being capable of moving on the first moving guide and the second moving guide whereby the moving body is capable of moving in a plane enclosed by the first fixed guides and the second fixed guides;

a first moving mechanism for moving the first moving guide; and a second moving mechanism for moving the second moving guide.

By attaching the screen frame of the present invention, which has a simple structure, to a screen of a display unit, video images on a screen have visual depth, so the user is hallucinated as if he or she really watch an outdoor scene through a window. Furthermore, the video images on the screen are clear since the influence of external light is removed.

By employing the attaching means, the screen frame can be easily attached to a conventional TV, etc.

By integrating the screen frame with the body part of the display unit, the display unit can be efficiently manufactured with lower cost.

In the display unit provided in the wall, the display unit can be seen like a window, so that the reality of the video images can be further improved.

In the video system having the means for receiving the video data, the video data, which are transmitted from many kinds of facilities, e.g., a broadcasting satellite, can be received.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described by way of examples and with reference to the accompanying drawings, in which:

FIG. 5 is a perspective view of a display unit having the screen frame shown in FIG. 4;

FIG. 6 is an explanation view of a video system;

FIG. 8 is a sectional view of a capsule of the virtual simulator;

DETAILED DESCRIPTION OF THE PREFERRED EMBODIMENTS

Preferred embodiments of the present invention will now be described in detail with reference to the accompanying drawings.

Figure 1:
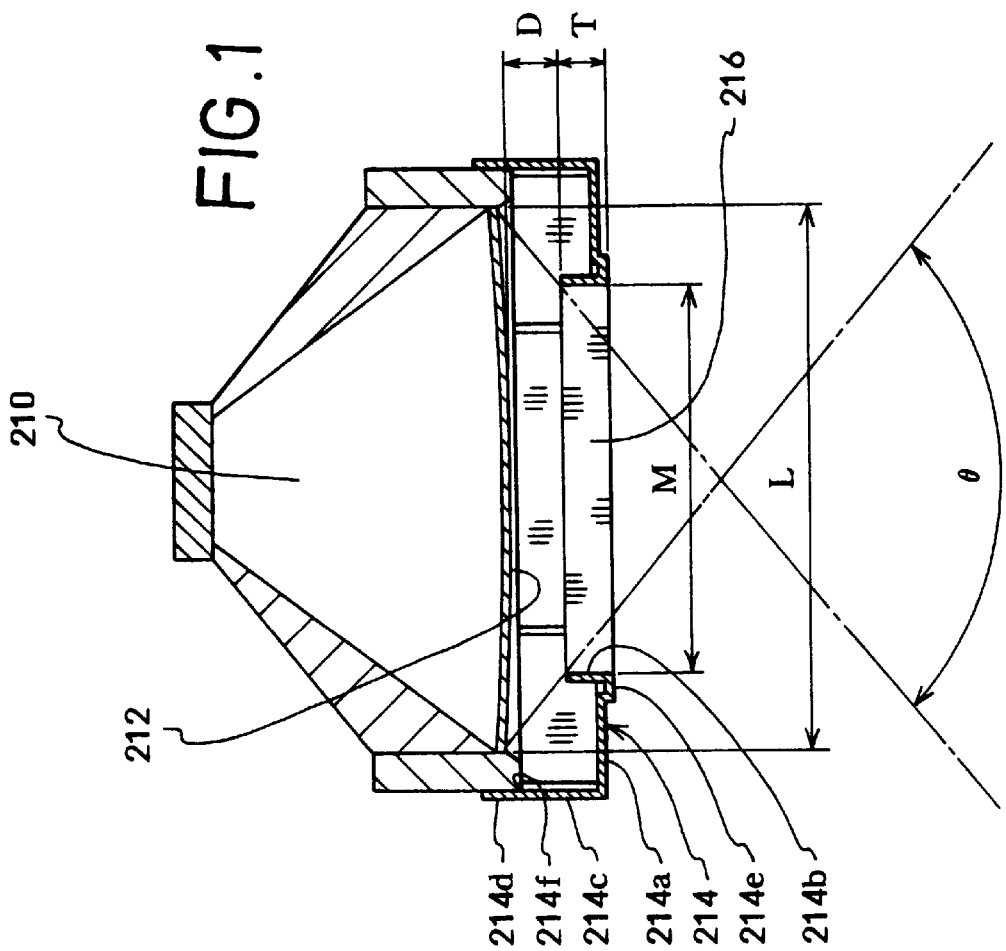
FIG. 1 is a sectional view of a display unit having a screen frame of an embodiment.
Figure 2:
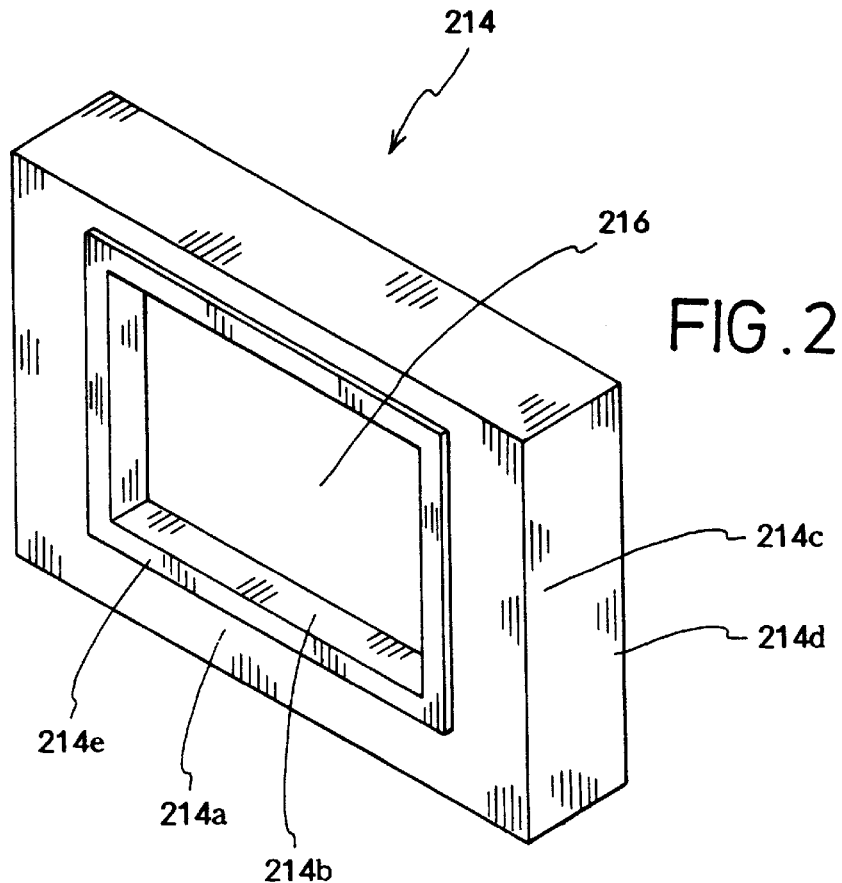
FIG. 2 is a perspective view of the screen frame shown in FIG. 1.

FIG. 1 is a sectional view of a display unit having a screen frame of the present embodiment; FIG. 2 is a perspective view of the screen frame shown in FIG. 1; and FIG. 3 is a sectional view of the screen frame shown in FIG. 2.

A TV 210 is an example of a display unit. Inner elements of the TV 210 are omitted in FIG. 1. A screen 212 on which video images are reproduced is made of a glass.

A screen frame 214 has a frame structure enclosing a hollow window space 216, and it is fixed a prescribed distance away from the screen 212. The size of the window space 216 is smaller than that of the screen 212 of the so as to cover parts of the TV 210 other than the screen 212 within an angle θ.

Figure 3:
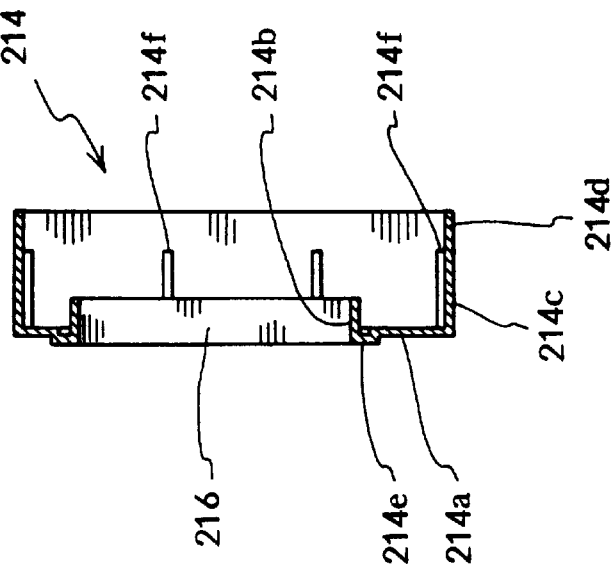
FIG. 3 is a sectional view of the screen frame shown in FIG. 2.

As clearly shown in FIGS. 1–3, the screen frame 214 includes: a front section 214a; an inner section 214b; a side wall section 214c; and an attaching section 214d. An inner edge section 214e of the front section 214a is formed into a step, so the screen frame 214 looks like a room window.

The TV 210 is covered with the screen frame 214 by fitting the attaching section 214d over the TV 210 until an end face of a rib, which is formed on an inner face of the side section 214c, contacts a front edge of the TV 210 as shown in FIG. 1.

The screen frame 214 has a simple structure, so it can be easily manufactured with low cost. The screen frame 214 can be made by, for example, resin molding. The resin molding can be executed with a pair of molding dies, which can be opened in the vertical direction, or a vacuum molding die, in which melted resin is drawn onto a die face.

The screen frame 214 of the present embodiment can be easily attached to conventional display units, e.g., TVs.

By attaching the screen frame 214, video images on the screen can be seen as 3-D images with enough visual depth.

With 3-D images having enough visual depth, the user will be hallucinated as if he or she really watch an outdoor scene through a window. The window space 216 is smaller than the screen 212, and the screen frame 214, which includes the inner section 214b with thickness T, is separated a prescribed distance D away from the screen 212. Furthermore, even if the window space 216 is diagonally seen within the angle θ, the scene shifts sideward but no parts other than the screen 212, on which video images are shown, are seen through the window space 216, so the user can see the 3-D video images.

Note that, the size of the window space 216 and the distance D are properly designed according to the size of the screen 212. If the width M of the window space 216 is narrower, the width of the visual field therethrough is narrower, so the width L of the screen 212 may be narrower as far as the user watches the screen within the angle θ. Similarly, if the thickness T of the window space 216 is thicker, the width of the visual field therethrough is thicker, so the width L of the screen 212 may be thicker as far as the user watches the screen within the angle θ. Note that, if the width L of the screen 212 is wider, the 3-D effect can be improved.

The visual depth of video images of distance views is more effective than that of close-range views.

By attaching latticeworks in the window space 216, the visual depth can be improved. Horizontal and/or vertical bars, beams, meshes, etc. may act as the latticeworks. By attaching the latticeworks, the user's eyes focus at a position on the user side of the latticeworks, so the visual depth of video images on the screen 212 will be further improved.

If a lens is attached in the window space 216 so as to scale down the video images on the screen 212, the visual depth can be further improved. In this case, the lens of the window space 216 may be a planar lens, on which fine grooves are coaxially formed.

Furthermore, accessories, e.g., curtains, may be attached to the screen frame 214 to imitate a room window, so the video images in the window space 216 will be more realistic.

By using the screen frame 214 of the present embodiment, the video images can be clear. The screen frame 214 shuts out external light as a hood. Even if the TV is located in a well-lighted place, the video images on the screen of the TV will be clear as if watching in a dark place.

If inner parts of the screen frame 214, which are out of sight, are colored black, diffused reflection on the screen 212 can be prevented, so that the hood effect can be improved.

The screen frame 214 having the hood effect is preferably employed to liquid crystal display TVs, whose screens are apt to be influenced by the diffused reflection.

Furthermore, a lighting unit, which is capable of illuminating the screen 212, may be attached to the inner part of the screen frame 214, which are out of sight. The screen 212 may be illuminated with proper color or proper brightness light by the lighting unit. The lighting unit will make foggy images, etc. on the screen as if watching a natural scene through the room window which is highly realistic.

Next, another embodiment will be explained with reference to FIGS. 4 and 5.

Figure 4:
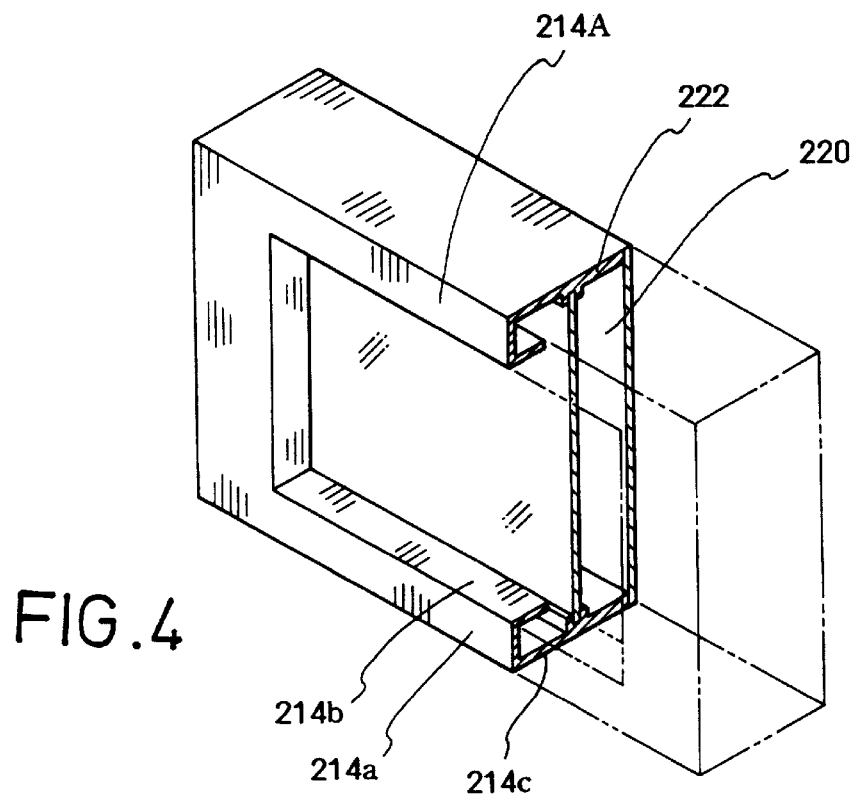
FIG. 4 is a perspective view of the screen frame of another embodiment.

A screen frame 214A is integrated with a body 222 of a plasma display panel (PDP) 220, which is an example of the display unit and whose inner elements are not shown in FIG. 4. The screen frame 214A also includes: a front section 214a; an inner section 214b; and a side wall section 214c, as well as the screen frame 214 shown in FIGS. 1–3. Thus, effects of the screen frame 214A are the same as those of the screen frame 214. Since the screen frame 214A is integrated with the body 222, they can be efficiently manufactured with low cost.

In the embodiment shown in FIG. 4, the display unit is the PDP 220, the screen frame integrated with the body part of the display unit can be employed to a TV as shown in FIG. 5. By the way, the PDP 220 will be preferably used as a large size, thin display unit with a high resolution.

Next, an embodiment of a video system will be explained with reference to FIG. 6.

As shown in FIG. 6, virtual windows 250, each of which is a display unit having the screen frame 214B of the present invention, are respectively built in four walls of a room 252, and they respectively head, for example, north, south, east and west.

Video images, which correspond to each virtual window 250, are recorded. Namely, four video cameras 230 are headed in different directions to record real scenes. For example, the video cameras 230 are headed north, south, east and west to record the scenes and sounds. If the length of one wall of the square room 252 is 5 m, the four cameras 230 are respectively located on each side of a regular square having 5 m sides and headed north, south, east and west to record the scenes and sounds.

A video recording medium 232 stores the video and sound data, which have been recorded by the video cameras 230. A laser disk, for example, may be employed as the video recording medium.

A video reproducing unit 234 reproduces the video and sound data, which have been stored in the recording medium, as video images and sounds.

Each virtual window 250 shows video images and play sounds which have been recorded by the corresponding video camera 230 and reproduced by the video reproducing unit 234. The virtual windows 250 have the screen frames, which have been described in the foregoing embodiments, so they have the same effects.

In the present invention, the video images and sounds are not limited to the images and sounds which are supplied by the recording medium 232, they can be supplied from a broadcasting station, a broadcasting satellite, etc.

A transmitting unit 236 transmits data of the video images and sounds which have been recorded by the video cameras 230. A data transmitting unit 237 which transmits the data from a recording place to a broadcasting station, a fixed broadcasting station 254 or a broadcasting satellite 256 acts as the transmitting unit 236.

A receiving unit 238 receives the image and sound data, which have been transmitted by the transmitting unit 236, and reproduces the data to show the image on the virtual windows 250.

For example, the scenes of north, south, east and west of a remote place can be transmitted via four channels of a communication satellite, and the video images and sounds thereof can be shown by the four virtual windows 250; a user in a room 252 can real-timely watch the scenes of the remote place.

In the video system of the present embodiment, the user in the room 252 can watch the north, south, east and west scenes of the remote place through the virtual windows 250, and the sounds are also heard therefrom, so the user can be hallucinated as if staying at the remote place.

Note that, the number of the video cameras 230 is not limited to four, it may be one, two, three, five, six, etc. If the room is a small and closed room, the effects can be achieved by only one virtual window 250.

If the virtual windows 250 having the screen frames 214B are provided in the walls 240 of the room, the virtual windows 250 look like ordinary room windows, which are more realistic. Glass plates may be assembled in the screen frames to increase the realistic nature. Furthermore latticeworks and curtains may be provided on the virtual windows 250 to create real atmosphere.

As described above, the room 252 having the virtual windows 250 can be called the virtual room, and the inner space thereof can be created as the virtual space.

The virtual room can be properly adapted for a restaurant, a tea room, a sickroom, a guest room, etc.

A large scale display system of the present invention may be installed in a movie theater, a playhouse, etc. Furthermore, it may be used as an amusement machine in an amusement park, or an inner space of a theater, etc. may be a large virtual space.

In the case of making the large virtual space, the virtual window must be large, so a movie projector, etc. may be employed as the display unit.

Video softwares can be supplied by many kinds of media, e.g., laser disk or, broadcasting programs which include programs transmitted via a satellite.

Still images, e.g., a photograph, or photographs printed on a film which are illuminated by a back-light, may be used instead of moving images.

Next, an embodiment of a virtual simulator will be explained with reference to FIGS. 7–11.

Figure 7:
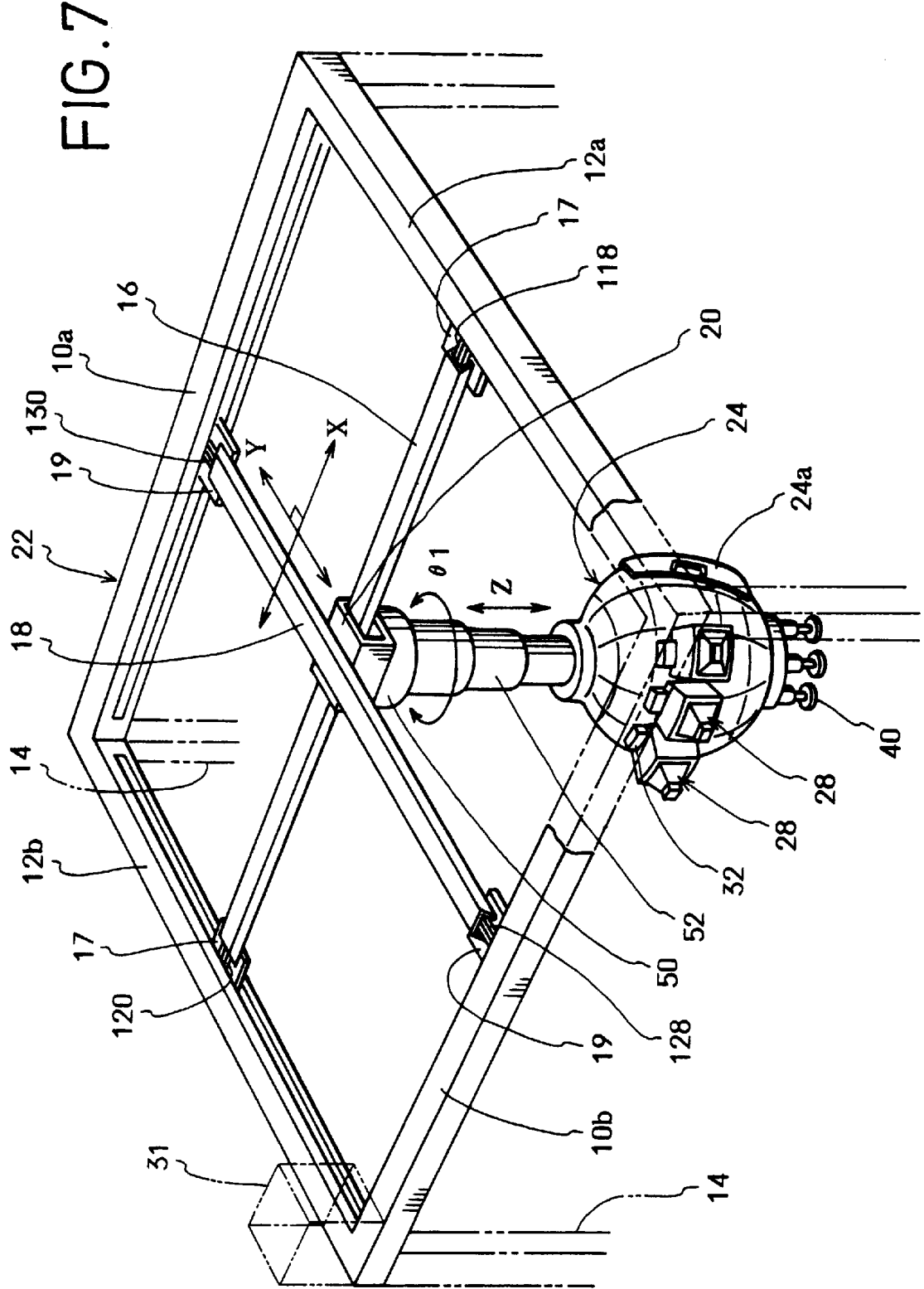
FIG. 7 is a perspective view of a virtual simulator.

FIG. 7 is a perspective view of the virtual simulator of the present embodiment. In the present embodiment, an X-direction is a first direction; a Y-direction is a second direction.

A pair of X-sides 10a and 10b constitute two sides, which are arranged in the X-direction, of four sides of a square frame 22. X-fixed guides, which are an example of first fixed guides, are arranged in the X-direction and respectively provided in the X-sides 10a and b.

A pair of Y-sides 12a and 12b constitute two sides, which are arranged in the Y-direction, of the four sides of the square frame 22. Y-fixed guides, which are an example of second fixed guides, are arranged in the Y-direction and respectively provided in the Y-sides 12a and 12b.

The X-sides 10a and 10b and the Y-sides 12a and 12b are mutually connected to form the square frame 22. The square frame 22 is supported by pillars 14, which are respectively provided at each corner of the frame 22.

An X-moving guide 16 is arranged parallel to the X-fixed guides, and its ends are respectively movably connected with the Y-fixed guides. The X-moving guide 16 acts as a first moving guide, which is capable of moving in the Y-direction along the Y-fixed guides. Each end of the X-moving guide 16 is fixed to each traveller 17. The travellers 17 are attached to the Y-fixed guides to move along the Y-fixed guides.

A Y-moving guide 18 is arranged parallel to the Y-fixed guides, and its ends are respectively movably connected with the X-fixed guides. The Y-moving guide 18 acts as a second moving guide, which is capable of moving in the X-direction along the X-fixed guides. Each end of the Y-moving guide 18 is fixed to each traveller 19. The travellers 19 are attached to the X-fixed guides to move along the X-fixed guides.

In the present embodiment, the hard beams 16 and 18 are used as the first moving guide and the second moving guide, but shafts pierced through a moving body 20, etc. may be used as the first moving guide and the second moving guide. Note that, the shaft moving guide (see FIGS. 12 and 13) and the hard beam moving guide (see FIGS. 14 and 15) will be explained later.

The moving body 20 is capable of moving, in the X- and the Y-directions in a plane enclosed by the square frame 22, on the X-moving guide 16 and the Y-moving guide 18. The moving body 20 is moved by a two dimensional drive system. The drive system for moving the moving body 20 includes: an X-moving mechanism for moving the X-moving guide 16; and a Y-moving mechanism for moving the Y-moving guide 18. Many kinds of mechanisms may be employed as the X- and the Y-moving mechanisms. Concrete examples will be described later.

A capsule 24 has an inner space 25 (see FIG. 8), a man or men can be accommodated therein. The inner space 25 can be closed or opened by a door 24a.

A rotating unit 50 is fixed in a bottom part of the moving body 20; an elevating unit 52 is fixed on a bottom part of the rotating unit 50; the capsule 24 is fixed to a bottom part of the elevating unit 52. With this structure, the capsule 24 is connected with the moving body 20. The capsule 24 is capable of rotating in the direction of an arrow θ1. Since the capsule 24 has a telescopic structure, the capsule 24 can be moved in the vertical direction Z. The capsule may be moved in the vertical direction by not only the telescopic structure but also other structures.

Note that, the moving body 20 has the rotating unit 50 and the elevating unit 52 as described above, and it may further have a unit for adjusting the rotational angle of the capsule 24 with respect to the Z-axis.

As shown in FIG. 8, a CRT 29, which constitutes a video display unit 28, is fitted in a window 26 of the capsule 24 so as to show video images. A transparent plate 27 is made of, for example, glass. The video images are shown on a screen 29a.

A speaker 30 of an audio unit is connected with the video display unit 28. An air conditioner 32 adjusts temperature and humidity in the capsule 24 and sends wind and a good smell thereinto.

A control unit 31, which includes a micro computer unit, controls the drive system to synchronize the movement of the capsule 24 while changing the video images shown on the CRT 29. The control unit 31 also controls the audio unit including the speaker 30, the air conditioner 32, etc.

The display unit 28 will be explained with reference to FIGS. 9 and 10. The screen 29a of the CRT 29 of the display unit 28 is located on an outer side of the window 26 of the capsule 24 and a prescribed distance away therefrom. The size of the screen 29a is larger than that of the window 26.

Figure 9:
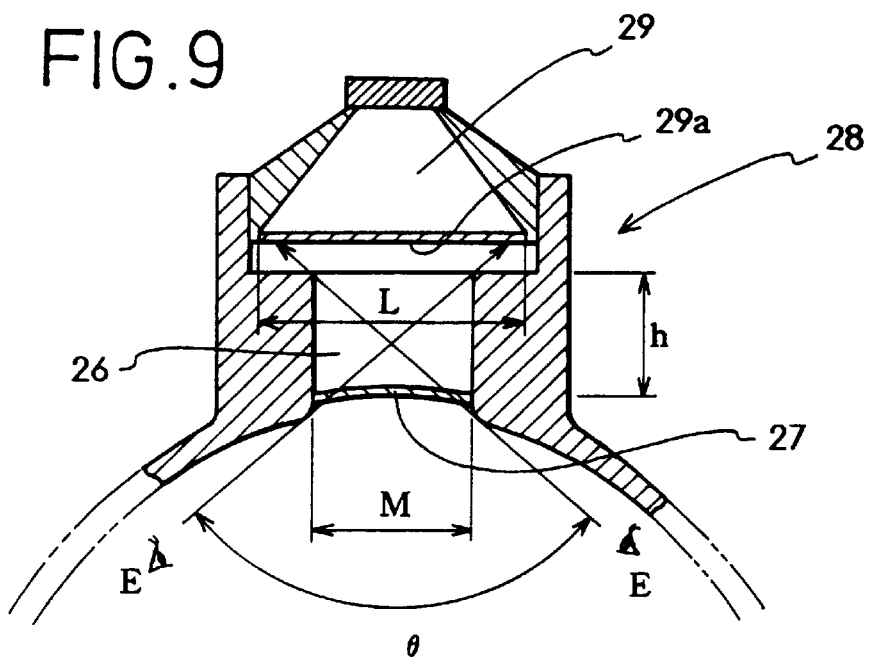
FIG. 9 is a sectional view of a display unit of the virtual simulator.

As shown in FIG. 9, for example, even if a man in the capsule 24 moves within the angle θ, the man can watch the video images of the display unit 28 in the whole window 26. Namely, the video images on the screen 29a are shifted while a looking point E of the man is moved, so the man can be hallucinated as if he is really watching the images through the window.

The size of the window 26 and the distance between the window 26 and the screen 29a are properly designed according to the size of the screen 29a. If the width M of the window 26 is narrower, the width of visual field therethrough is narrower, so width L of the screen 29a may be narrower as far as the man watches the screen within the angle θ. Similarly, if the thickness h of the window 26 is thicker, the width of visual field therethrough is thicker, so the width L of the screen 29a may be thicker as far as the man watches the screen within the angle θ. Note that, if the width L of the screen 29a is wider, the 3-D effect can be improved.

Figure 10:
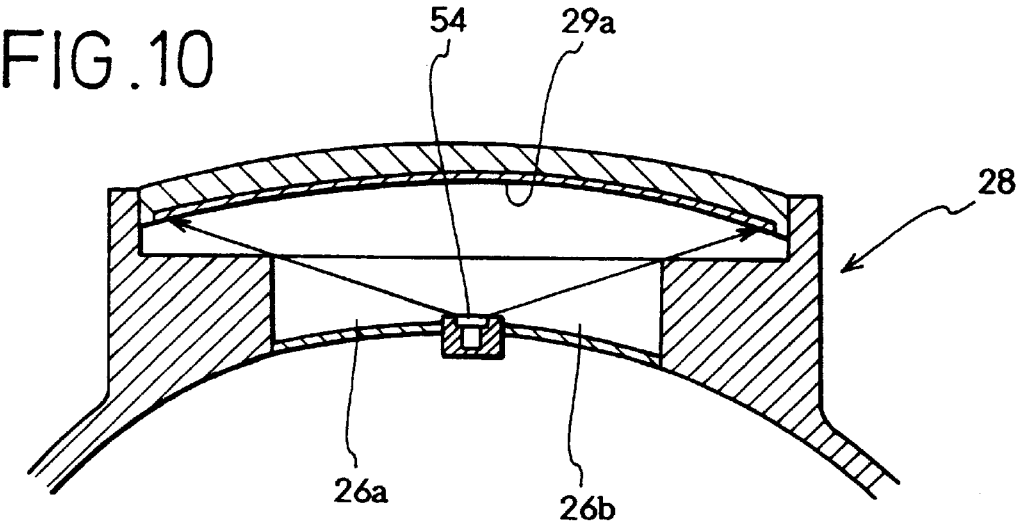
FIG. 10 is a sectional view of another display unit of the virtual simulator.

In FIG. 9, the display unit is provided on each window 26; in FIG. 10, one display unit 54 is provided for a plurality of windows 26a and 26b. In the latter case, the screen 29a is wider, so the visual angle of each window 26a and 26b can be wider. By providing one display unit 54, the reality of the video images can be improved, and the cost can be reduced. The display unit 54 shown in FIG. 10 is a movie projector. The display unit 54 may be the CRT shown in FIGS. 8 and 9, a 3-D phonograph unit, etc.

A handling unit 34 includes a control lever 34a, control switches, etc., and it is controlled by the man 36 sitting on a chair 38. Since the handling unit 34 for controlling the drive system is provided in the capsule 24, the man 36 can effectively experience the virtual space.

Legs 40 include shock absorbers, which properly absorb shock when the capsule 24, which is suspended by the drive system, touches the ground. By the ground shock, the virtual experience can be more real.

In the virtual simulator of the present embodiment, the control unit 31 controls the drive system to synchronize the movement of the capsule 24 with the change of the video images shown by the display units 28 and 54. With this control, the man 36 can be hallucinated as if he is really in the actual space.

Figure 11:
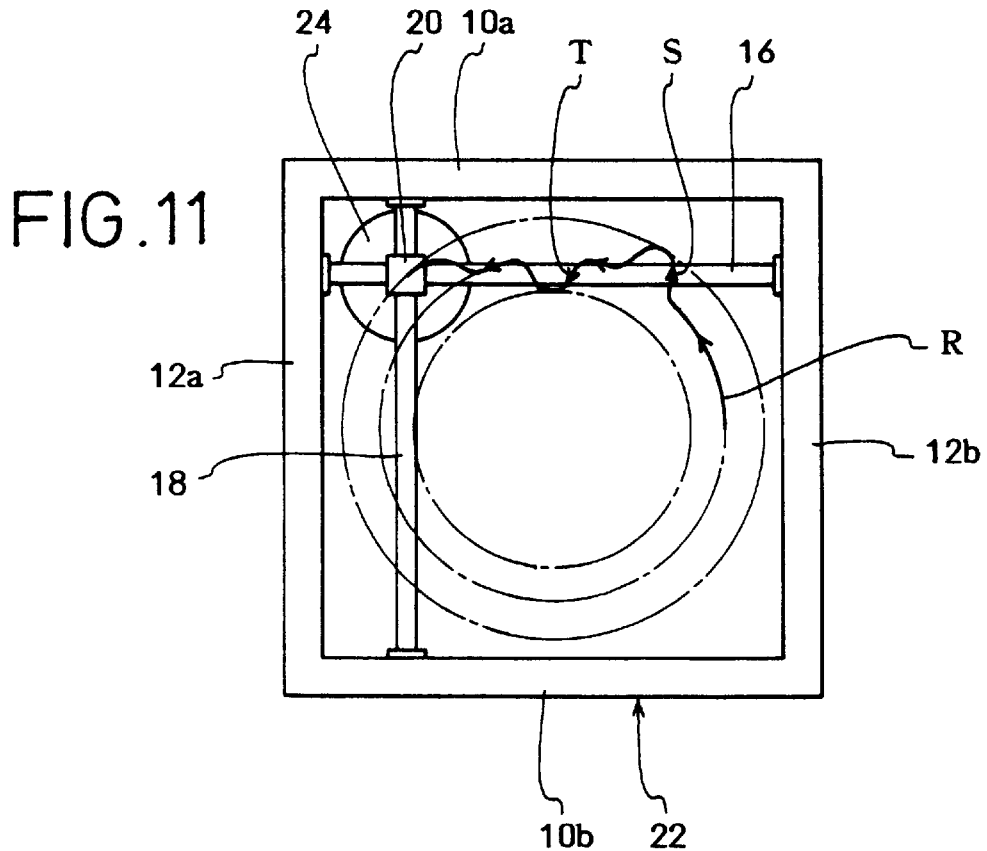
FIG. 11 is a plan view showing movement of a drive system of the virtual simulator.

As shown in FIG. 11, if the capsule 24 is moved on a circular orbit R which has a greater diameter, the man in the capsule is hallucinated as if moving linearly. By employing the two dimensional drive system of the present embodiment, the heavy capsule 24 can be easily moved. If the capsule 24 moves on the orbit R at or slower than prescribed speed, or if the diameter of the orbit R is greater than a prescribed length, centrifugal force working to the capsule 24 is weak, so that the man 36 in the capsule 24 is hallucinated as if moving linearly when the video images show a scene of linear movement. If the drive system is controlled to deviate the capsule 24 from the orbit R, the man 36 is hallucinated as if the capsule 24 moves to right and left because of rightward acceleration S and leftward acceleration T as shown in FIG. 11.

The movement of the drive system is controlled by the control unit 31, which includes the micro computer, so as to synchronize the movement with the change of the video images shown. By synchronizing the movement of the drive system with the video images, the virtual simulator is capable of creating the virtual space which is different from a virtual space created by the conventional machine. Namely, the conventional machine creates the virtual space by the computer graphics; the virtual simulator of the present embodiment creates the virtual space by combining the real video images and the actual movement synchronizing with the real video images.

The movement of the drive system may be controlled by the control lever 34a of the handling unit 34. The man 36 may move the control lever 34a rightward and leftward. In this case, the control unit 31 controls the video images to synchronize with signals from the handling unit 34. The computer graphic images may be employed as the video images. Furthermore, if the real video images are converted into digital signals, the real video images can be employed as the video images shown by the display unit 28 as well as the computer graphic images. In this case, too, the man 36 can easily experience the virtual space.

Successively, the two dimensional drive system of the present embodiment will be explained with reference to FIG. 12.

A base 102 is formed into a frame shape with a central hollow section.

First racks 106a and 106b are fixed on the base 102. The first racks 106a and 106b are arranged parallel in an X-direction, which is an example of a first direction.

Second racks 104a and 104b are fixed on the base 102. The second racks 104a and 104b are arranged parallel in a Y-direction, which is an example of a second direction.

First fixed guides 110a and 110b are fixed on the base 102. The first fixed guides 110a and 110b are respectively provided on each inner side of each first rack 106a and 106b, and mutually arranged parallel in the X-direction.

Second fixed guides 108a and 108b are fixed on the base 102. The second fixed guides 108a and 108b are respectively provided on each inner side of each second rack 104a and 104b, and mutually arranged parallel in the Y-direction.

First travellers 112a and 112b are respectively slidably fitted to the second fixed guides 108a and 108b, and they cannot be disassembled upward. Thus, the first travellers 112a and 112b are capable of moving in the Y-direction along the second fixed guides 108a and 108b and keeping parallel to the second racks 104a and 104b.

Second travellers 114a and 114b are respectively slidably fitted to the first fixed guides 110a and 110b, and they cannot be disassembled upward. Thus, the second travellers 114a and 114b are capable of moving in the X-direction along the first fixed guides 110a and 110b and keeping parallel to the first racks 106a and 106b.

First pipes 116a and 116b are arranged in the X-direction. Each end of the first pipes 116a and 116b are respectively fixed to the first travellers 112a and 112b. A first moving guide is constituted by connecting the first pipes 116a and 116b with the first travellers 112a and 112b.

A first shaft 118 is arranged in the X-direction. The first shaft 118 is a metal shaft. The first shaft 118 is rotatably pierced through the first pipe 116a and the first travellers 112a and 112b. Each end of the first shaft 118 is respectively projected outward from the first travellers 112a and 112b. Snap rings are attached on an outer circumferential face of the first shaft 118 and provided on outer sides of the first travellers 112a and 112b so as to limit axial movement of the first shaft 118.

A second shaft 120 is arranged in the X-direction. The second shaft 120 is a metal shaft. The second shaft 120 is rotatably pierced through the first pipe 116b and the first travellers 112a and 112b. Each end of the second shaft 120 is respectively projected outward from the first travellers 112a and 112b. Snap rings are attached on an outer circumferential face of the second shaft 120 and provided on outer sides of the first travellers 112a and 112b so as to limit axial movement of the second shaft 120.

By piercing the first shaft 118 and the second shaft 120 through the first travellers 112a and 112b, the first travellers 112a and 112b can be integrally moved in the Y-direction. A lubricant, e.g., grease, is filled in the first pipes 116a and 116b, so that abrasion and noise between the first and the second shafts 118 and 120 and the first pipes 116a and 116b is reduced.

First pinion gears 122a and 122b are respectively fixed to each end of the first shaft 118. The first pinion gears 122a and 122b are respectively rotatably engaged with the second racks 104a and 104b. Thus, the first pinion gears 122a and 122b rotate on the second racks 104a and 104b together with the first shaft 118 if the first travellers 112a and 112b are moved in the Y-direction.

Second pinion gears 124a and 124b are respectively fixed to each end of the second shaft 120. The second pinion gears 124a and 124b are respectively rotatably engaged with the second racks 104a and 104b. Thus, the second pinion gears 124a and 124b rotate on the second racks 104a and 104b together with the second shaft 120 if the first travellers 112a and 112b are moved in the Y-direction.

Second pipes 126a and 126b are arranged in the Y-direction. Each end of the second pipes 126a and 126b are respectively fixed to the second travellers 114a and 114b. A second moving guide is constituted by connecting the second pipes 126a and 126b with the second travellers 114a and 114b.

A third shaft 128 is arranged in the Y-direction. The third shaft 128 is a metal shaft. The third shaft 128 is rotatably pierced through the second pipe 126a and the second travellers 114a and 114b. Each end of the third shaft 128 is respectively projected outward from the second travellers 114a and 114b. Snap rings are attached on an outer circumferential face of the third shaft 128 and provided on outer sides of the second travellers 114a and 114b so as to limit axial movement of the third shaft 128.

A fourth shaft 130 is arranged in the Y-direction. The fourth shaft 130 is a metal shaft. The fourth shaft 130 is rotatably pierced through the second pipe 126b and the second travellers 114a and 114b. Each end of the fourth shaft 130 is respectively projected outward from the second travellers 114a and 114b. Snap rings are attached on an outer circumferential face of the fourth shaft 130 and provided on outer sides of the second travellers 114a and 114b so as to limit axial movement of the fourth shaft 130.

By piercing the third shaft 128 and the fourth shaft 130 through the second travellers 114a and 114b, the second travellers 114a and 114b can be integrally moved in the X-direction. The lubricant, e.g., grease, is filled in the second pipes 126a and 126b, so that abrasion and noise between the third and the fourth shafts 128 and 130 and the second pipes 126a and 126b is reduced.

Third pinion gears 132a and 132b are respectively fixed to each end of the third shaft 128. The third pinion gears 132a and 132b are respectively rotatably engaged with the first racks 106a and 106b. Thus, the third pinion gears 132a and 132b rotate on the first racks 106a and 106b together with the third shaft 128 if the second travellers 114a and 114b are moved in the X-direction.

Fourth pinion gears 134a and 134b are respectively fixed to each end of the fourth shaft 130. The fourth pinion gears 134a and 134b are respectively rotatably engaged with the first racks 106a and 106b. Thus, the fourth pinion gears 134a and 134b rotate on the first racks 106a and 106b together with the fourth shaft 130 if the second travellers 114a and 114b are moved in the Y-direction.

A moving body 146 is capable of moving on the first pipes 116a and 116b and the second pipes 126a and 126b. Thus, the moving body 146 moves in the Y-direction when the first travellers 112a and 112b are moved in the Y-direction. On the other hand, the moving body 146 moves in the X-direction when the second travellers 114a and 114b are moved in the X-direction. By connecting the capsule 24 with the moving body 146, The capsule 24 can be moved in the X- and the Y-directions. Note that, in the present embodiment, the moving body 146 moves on the first pipes 116a and 116b and the second pipes 126a and 126b, but it may move on the first shaft 118, the second shaft 120, the third shaft 128 and the fourth shaft 130.

Figure 13:
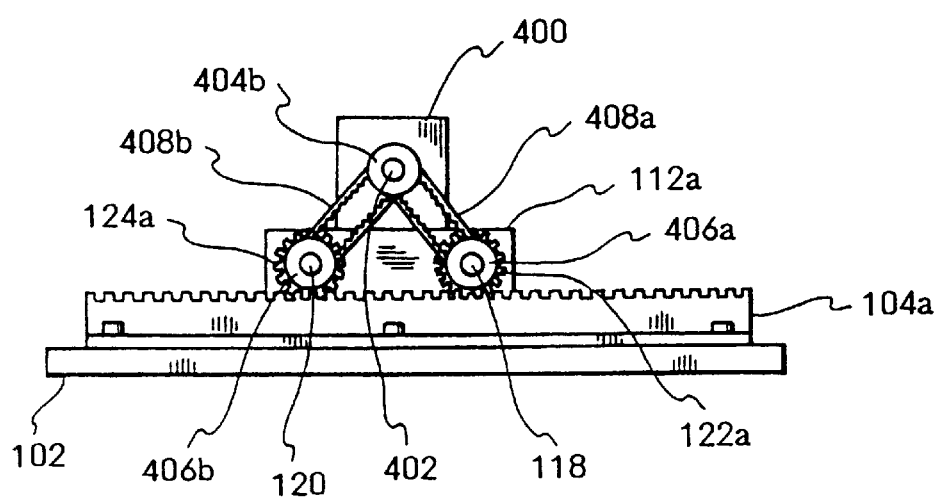
FIG. 13 is a side view of a moving mechanism of the drive system shown in FIG. 12.

Next, the moving mechanisms in the two dimensional drive system 100 (see FIG. 12) will be explained with reference to FIGS. 12 and 13.

A first moving mechanism for moving the first moving guide includes: a first servo motor 400 provided on the first traveller 112a; and a first transmitting section for transmitting rotary torque of the first motor 400 so as to rotate the first shaft 118 and the second shaft 120 in the same direction. The first transmitting section includes: first timing pulleys 404a and 404b fixed to an output shaft 402 of the first motor 400; second timing pulleys 406a and 406b respectively fixed to the first shaft 118 and the second shaft 120; and first timing belts 408a and 408b respectively engaged between the first timing pulleys 404a and 404b and the second timing pulleys 406a and 406b.

On the other hand, a second moving mechanism for moving the second moving guide includes: a second servo motor 410 provided on the second traveller 114a; and a second transmitting section for transmitting rotary torque of the second motor 410 so as to rotate the third shaft 128 and the fourth shaft 130 in the same direction. The second transmitting section includes: third timing pulleys 414a and 414b fixed to an output shaft 412 of the second motor 410; fourth timing pulleys 416a and 416b respectively fixed to the third shaft 128 and the fourth shaft 130; and second timing belts 418a and 418b respectively engaged between the third timing pulleys 414a and 414b and the fourth timing pulleys 416a and 416b.

The first shaft 118 and the second shaft 120 are rotated in the same direction by the first motor 400. Similarly, the third shaft 128 and the fourth shaft 130 are rotated in the same direction by the second motor 410. By the rotation of the shafts 118, 120, 128 and 130, the first travellers 112a and 112b are moved in the Y-direction at the same speed; the second travellers 114a and 114b are moved in the X-direction at the same speed. Thus, the moving body 146 can be moved in the X- and the Y-directions.

Figure 12:
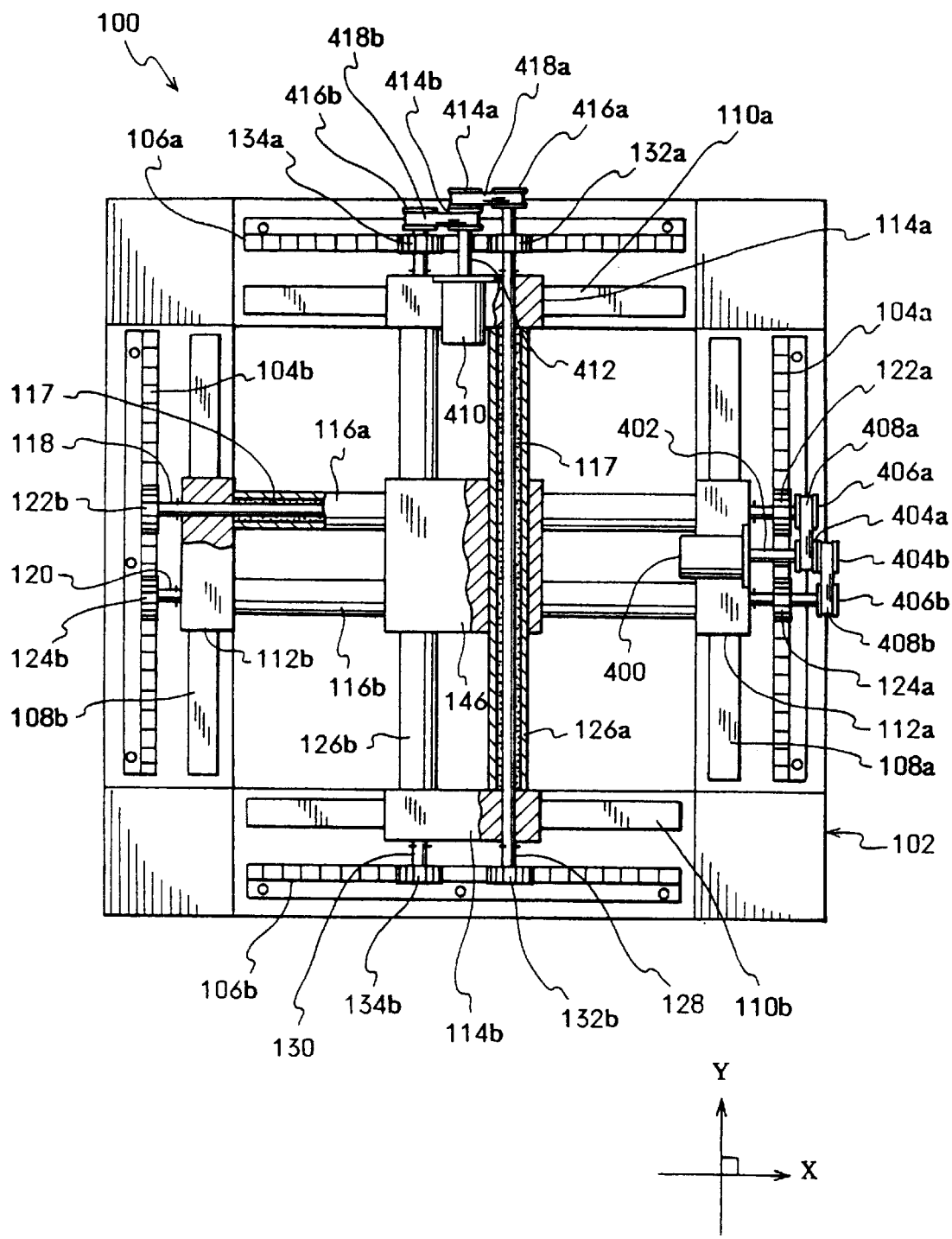
FIG. 12 is a plan view of the drive system.

Note that, in the embodiment shown in FIG. 12, the shafts 118 and 120 are simultaneously rotated by the first motor 400, and the shafts 128 and 130 are simultaneously rotated by the second motor 410, but each motor 400 and 410 may rotate one shaft of each pair, and the other shaft of each pair may rotate freely.

Figure 14:
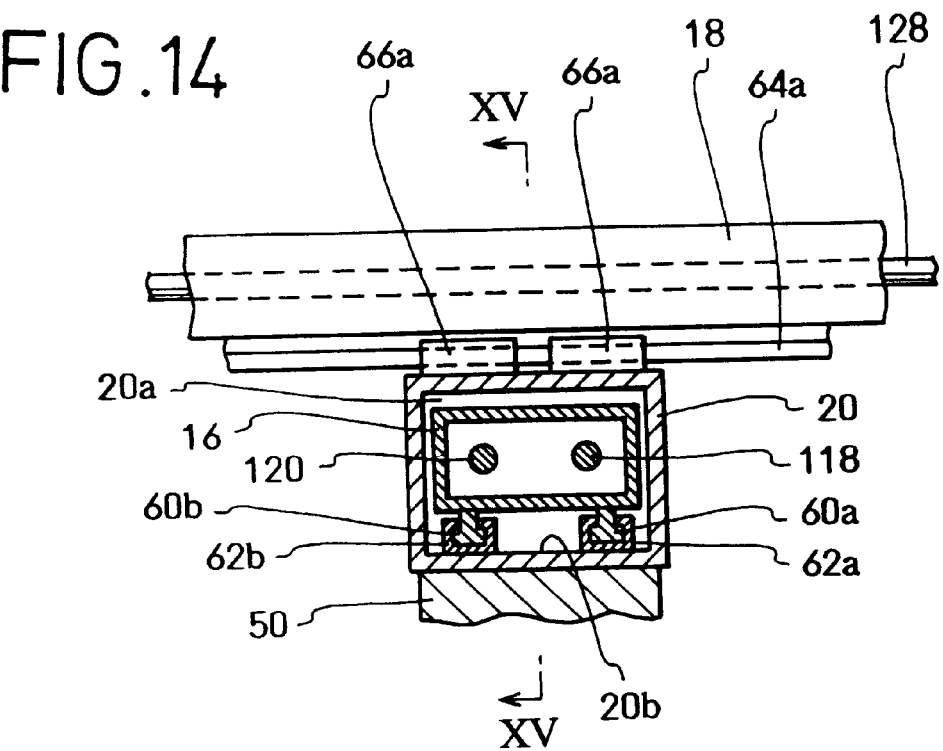
FIG. 14 is a partial sectional view showing a connection between a moving body and a moving guide shown in FIG. 7.
Figure 15:
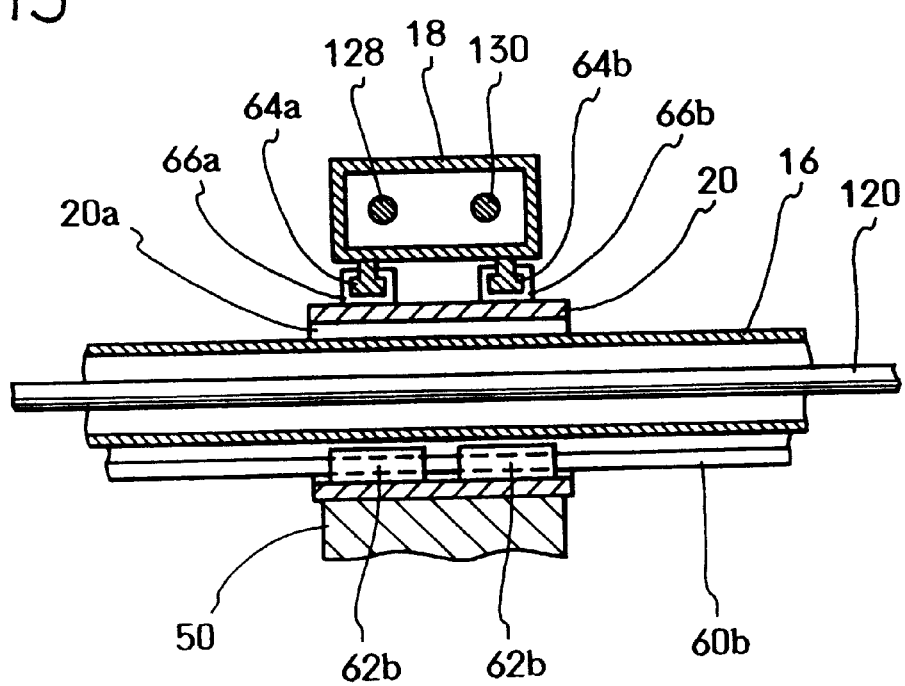
FIG. 15 is a sectional view taken along a line XV—XV shown in FIG. 14.

Next, a movable connecting structure between the moving body 20, the X-moving guide 16 and the Y-moving guide 18 (see FIG. 7) will be explained with reference to FIGS. 14 and 15.

The moving body 20 is formed into a block shape, and it has a through-hole 20a, which is bored in the X-direction. The X-moving guide 16 is pierced through the through-hole 20a, so that the moving body 20 is movably connected with the X-moving guide 16. An upper end section of the moving body 20 is movably connected with the Y-moving guide 18, which is arranged in the Y-direction perpendicular to the X-moving guide 16.

Linear guides 60a and 60b are respectively fixed on a bottom face of the X-moving guide 16 and arranged in the longitudinal direction thereof. Sliding members 62a and 62b are fixed on an inner bottom face 20b of the through-hole 20a, and they are respectively movably fitted to the linear guides 60a and 60b by dove tail structures. Thus, the moving body 20 is connected with the linear guides 60a and 60b of the X-moving guide 16 and capable of linearly moving.

The X-moving guide 16 and the Y-moving guide 18 have hollow structures, so they are light and tough beams. Thus, strength and mobility of the drive system can be improved.

The first shaft 118 and the second shaft 120 are pierced through the hollow space of the X-moving guide 16 as well as the embodiment shown in FIG. 12, so the both ends of the X-moving guide 16 can be synchronously moved by twisting torsion in the X-moving guide 16.

The third shaft 128 and the fourth shaft 130 are pierced through the hollow space of the Y-moving guide 18 as well as the embodiment shown in FIG. 12, so the both ends of the Y-moving guide 18 can be synchronously moved by the twisting torsion in the Y-moving guide 18.

By employing the movable connecting structure between the moving body 20, the X-moving guide 16 and the Y-moving guide 18, heavy bodies, e.g., the capsule 24 (see FIG. 7), can be moved in a state of being suspended or held.

The two dimensional drive system for moving the capsule 24, etc., which is shown in FIGS. 7 and 12–15 has the following advantages.

The two dimensional drive system supports loads by four sides and drives the movable members, e.g., the capsule 24, by moving mechanisms in the four sides. With this structure, the drive system has strength much greater than the strength of a conventional single arm suspending structure, e.g., a crane, so that the virtual simulator can be compact in size. And the moving body 20 is always located at a cross point of the beams 16 and 18, so rolling of the capsule 24, which is suspended by the moving body 20, can be prevented. By providing the moving mechanisms in the four sides, the drive system can be moved with high accuracy and the load moment working to the beams 16 and 18 can be reduced; the drive system is capable of reducing influence of acceleration and braking, and its high speed performance can be raised. Namely, the capsule 24 can be truly moved according to the control signals from the control unit 31. By the high motility of the drive system, the man in the capsule 24 can experience a high degree of virtual space.

With said unique structure, the two dimensional drive system can be made longer, e.g., 7 m, 10 m. If the two dimensional drive system is long, the virtual linear movement can be easily produced.

Further, the two dimensional drive system is formed into a square shape, so it is capable of constituting any face of a cubic structure, so the cubic structure can be used as a drive unit, and a plurality of drive unit can be easily and efficiently connected to each other.

In the virtual simulator of the present embodiment, real video images can be employed as the images shown in the virtual space. The real video images can be easily collected with low cost, so many kinds of images can be supplied. Thus, many kinds of virtual spaces can be economically and easily produced. In the case of employing the real video images, the reality of the virtual space will be further improved with respect to the computer graphics.

By wearing no 3-D goggles, a plurality of men or women can simultaneously experience the same virtual space like a real space.

The capsule has a small inner space, so a very realistic virtual space can be easily produced by not only the 3-D video images but also sounds, good smell, wind, temperature, etc. with low cost.

The virtual simulator may be employed to the following fields:

(1) a training simulator, e.g., an aircraft, a space ship, an automobile;

(2) a business supporting system, e.g., a management game system, a presentation system;

(3) an amusement machine, e.g., a video game, a movie theater; and (4) an education supporting system, e.g., a virtual experiment, a science education tool, a geography education tool.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A window frame for a screen of a display unit comprising:

a frame structure being capable of covering over said screen of said display unit at a prescribed distance away from said screen; and said frame structure enclosing a window space having a size smaller than a size of said screen of the display unit, said frame structure covering parts of the display unit other than said screen, whereby only said screen is visible through the window space from a plurality of view points within a prescribed range, said frame structure including:

a front wall having an aperture therein for defining said window space, said front wall being arranged in a first plane substantially parallel to said screen, said aperture forming inner edges of said front wall; and a plurality of inner walls extending from said inner edges of said front wall toward said screen, said inner walls being arranged substantially perpendicular to said first plane, whereby said inner walls are visible as inner faces of said window frame.

2. The window frame according to claim 1, further comprising means for attaching said frame structure to the display unit.

3. The window frame according to claim 1, wherein a width of said inner walls is wider than a thickness of said front wall.

4. The window frame according to claim 3, wherein a plurality of outer side walls are positionable adjacent to outside surfaces of the display unit at a spaced location from the screen, said outer side walls including ribs for spacing said front wall at a prescribed distance away from the screen of the display unit, said outer side walls extending from outer edges of said front wall toward said screen.

5. A display unit, comprising:

a screen; and a window frame including a frame structure being capable of covering over said screen at a prescribed distance away from said screen, said frame structure enclosing a window space having a size smaller than a size of said screen, said frame structure covering parts of said display unit other than said screen, whereby only the screen is visible through the window space from a plurality of view points within a prescribed range, said frame structure including:

a front wall having an aperture therein for defining said window space, said front wall being arranged in a first plane substantially parallel to said screen, said aperture forming inner edges of said front wall; and a plurality of inner walls extending from said inner edges of said front wall toward said screen, said inner walls being arranged substantially perpendicular to said first plane, whereby said inner walls are visible as inner faces of said window frame.

6. The display unit according to claim 5, wherein said window frame is integrated with a body part of said display unit.

7. The display unit according to claim 5, wherein a body of said display unit is provided in a wall.

8. A video system, comprising:

a plurality of video cameras headed in mutually different directions;

a recording medium being capable of storing video data sent from said video cameras;

a video reproducing unit for reproducing the video data stored in said recording medium, as video images;

a plurality of display units having screens being respectively arranged at positions corresponding to the heading of said video cameras, said display units showing the video images, reproduced by said video reproducing unit, on the screens; and a plurality of frame structures being capable of respectively covering over the screen of each display unit at a prescribed distance away from the screen, each frame structure enclosing a window space having a size smaller than a size of the screen, said frame structure covering parts of the display unit other than the screen, whereby only the screen is visible through the window space from a plurality of view points within a prescribed range, said frame structure including:

a front wall having an aperture therein for defining said window space, said front wall being arranged in a first plane substantially parallel to said screen, said aperture forming inner edges of said front wall; and a plurality of inner walls extending from said inner edges of said front wall toward said screen, said inner walls being arranged substantially perpendicular to said first plane, whereby said inner walls are visible as inner faces of said window frame.

9. A video system, comprising:

a plurality of video cameras headed in mutually different directions;

means for transmitting video data sent from said video cameras;

means for receiving the video data transmitted from said transmitting means;

a plurality of display units having screens for reproducing the video data, received by said receiving means, as video images and showing the video images on the screens, said display units being respectively arranged at positions corresponding to the headings of said video cameras; and a plurality of window frames being capable of respectively covering over the screen of each display unit at a prescribed distance away from the screen, each window frame having a frame structure enclosing a window space having a size smaller than a size of the screen, said frame structures covering parts of the display unit other than the screen, whereby only the screen is visible through the window space from a plurality of view points within a prescribed range, said frame structure including:

a front wall having an aperture therein for defining said window space, said front wall being arranged in a first plane substantially parallel to said screen, said aperture forming inner edges of said front wall; and a plurality of inner walls extending from said inner edges of said front wall toward said screen, said inner walls being arranged substantially perpendicular to said first plane, whereby said inner walls are visible as inner faces of said window frame.

10. A virtual simulator, comprising:

a capsule for accommodating a man;

a drive system for moving said capsule;

a display unit having a screen and being provided in said capsule, said display unit showing video images on the screen;

a window frame being capable of covering over the screen of said display unit at a prescribed stance away from the screen, said window frame having a frame structure enclosing a window space having a size smaller than a size of the, said frame structure covering parts of the display unit other than the screen, whereby only the screen is visible through the window space from a plurality of view points within a prescribed range, said frame structure including:

a front wall having an aperture therein for defining said window space, said front wall being arranged in a first plane substantially parallel to said screen, said aperture forming inner edges of said front wall; and a plurality of inner walls extending from said inner edges of said front wall toward said screen, said inner walls being arranged substantially perpendicular to said first plane, whereby said inner walls are visible as inner faces of said window frame; and a control unit for controlling said drive system so as to synchronize the movement of said capsule with changing video images on the screen of said display unit.

11. The virtual simulator according to claim 10, wherein said drive system comprises:

a pair of first fixed guides being arranged in parallel in a first direction;

a pair of second fixed guides being arranged in parallel in a second direction perpendicular to the first direction;

a first moving guide being arranged parallel to said first fixed guides, each end of said first moving guide being movably connected with each second fixed guide whereby said first moving guide is capable of moving in the second direction along side said second fixed guides;

a second moving guide being arranged parallel to said second fixed guides, each end of said second moving guide being movably connected with each first fixed guide whereby said second moving connected with each first fixed guide whereby said second moving guide is capable of moving in the first direction along side said first fixed guides;

a moving body being connected to said capsule, said moving body being capable of moving on said first moving guide and said second moving guide whereby said moving body is capable of moving in a plane enclosed by said first fixed guides and said second fixed guides;

a first moving mechanism for moving said first moving guide; and a second moving mechanism for moving said second moving guide.

12. A virtual simulator, comprising:

a capsule for accommodating a man;

a drive system for moving said capsule;

a handling unit for manually controlling said drive system, said handling unit being provided in said capsule;

a display unit having a screen and being provided in said capsule, said display unit showing video images on the screen;

a window frame being capable of covering over the screen of said display unit at a prescribed distance away from the screen, said screen frame having a frame structure enclosing a window space having a size smaller than a size of the screen, said frame structure covering parts of the display unit other than the screen, whereby only the screen is visible through the window space from a plurality of view points within a prescribed range, said frame structure including:

a front wall having an aperture therein for defining said window space, said front wall being arranged in a first plane substantially parallel to said screen, said aperture forming inner edges of said front wall; and a plurality of inner walls extending from said inner edges of said front wall toward said screen, said inner walls being arranged substantially perpendicular to said first plane, whereby said inner walls are visible as inner faces of said window frame; and a control unit for controlling said drive system so as to synchronize the movement of said capsule with changing video images on the screen of said display unit.

* * * * *